US007586855B1

(12) United States Patent
Yellai et al.

(10) Patent No.: US 7,586,855 B1
(45) Date of Patent: Sep. 8, 2009

(54) SYSTEM AND METHOD TO DETECT NON-NATIVE STORAGE COMPONENTS TO MANAGE CONFIGURATION IN A COMMUNICATIONS NETWORK

(75) Inventors: Prabhakara Rao Yellai, San Jose, CA (US); Alex Van Truong, Santa Clara, CA (US)

(73) Assignee: Cisco Technology, Inc., San Jose, CA (US)

(*) Notice: Subject to any disclaimer, the term of this patent is extended or adjusted under 35 U.S.C. 154(b) by 1469 days.

(21) Appl. No.: 10/314,013

(22) Filed: Dec. 5, 2002

(51) Int. Cl.
  *H04L 12/28* (2006.01)
  *H04L 12/50* (2006.01)
(52) U.S. Cl. .................... 370/255; 370/363
(58) Field of Classification Search ......... 370/252–255, 370/363, 378–383
  See application file for complete search history.

(56) References Cited

U.S. PATENT DOCUMENTS

| | | | |
|---|---|---|---|
| 5,946,717 A * | 8/1999 | Uchibori .................. 711/207 |
| 6,105,026 A * | 8/2000 | Kruglikov et al. .............. 707/8 |
| 6,370,529 B1 * | 4/2002 | Kruglikov et al. .............. 707/8 |
| 6,700,870 B1 * | 3/2004 | Brandt et al. ................ 370/230 |
| 6,898,202 B2 * | 5/2005 | Gallagher et al. ........... 370/401 |
| 6,915,402 B2 * | 7/2005 | Wilson et al. ................ 711/173 |
| 6,986,052 B1 * | 1/2006 | Mittal ......................... 713/190 |
| 7,036,020 B2 * | 4/2006 | Thibadeau ................... 713/193 |
| 7,146,499 B2 * | 12/2006 | Yellepeddy .................. 713/165 |
| 7,225,341 B2 * | 5/2007 | Yoshino et al. .............. 713/193 |
| 2005/0268114 A1 * | 12/2005 | Thibadeau ................... 713/189 |

* cited by examiner

*Primary Examiner*—Hong Cho
(74) *Attorney, Agent, or Firm*—Schwegman, Lundberg & Woessner, P.A.

(57) ABSTRACT

A system and method to detect non-native storage components to manage configuration in a communications network are disclosed. A stored key set is retrieved from each storage component of a network switch in a communications network, the stored key set identifying each storage component in relation to the switch. The stored key set of each storage component is validated. Finally, a new key set is generated for each storage component if the stored key set is an invalid key set.

41 Claims, 5 Drawing Sheets

SYSTEM AND METHOD TO DETECT NON-NATIVE STORAGE COMPONENTS TO MANAGE CONFIGURATION IN A COMMUNICATIONS NETWORK

FIELD OF THE INVENTION

The present invention relates generally to a digital communications network. More particularly, the present invention relates to a system and method to detect non-native storage components to manage configuration in the digital communications network.

BACKGROUND OF THE INVENTION

A digital network comprises of a group of nodes that are connected to each other through a variety or interfaces. The network can also be logically considered to comprise several layers including, for example, a physical layer, a data link layer, a network layer, and a transport layer. In each of these layers, different agreed upon standards that enable various vendor equipment to communicate may be used. The standards are also known as communications protocols.

In one example of a protocol for the digital network, Asynchronous Transfer Mode ("ATM") or "cell switching" is a technology designed for transmitting digital information such as voice, video, and data at high speeds through the digital network. In the ATM protocol, the digital information to be transferred is first arranged into equal sized units called cells having fixed lengths. The cells are then transmitted from node to node until they reach a destination node through a pathway (or connection) within the digital network.

The communication path between two nodes is established through a virtual circuit. In a virtual circuit, the path may be established and then removed, and resources along the path may be shared by multiple virtual circuits. When the data cells are sent through network switches that established virtual circuits through an automated call-setup procedure, the communication paths are called Switched Virtual Circuits ("SVCs"). SVCs must be reestablished each time data is to be sent. In contrast, Permanent Virtual Circuits ("PVCs") and Soft Permanent Virtual Circuits ("SPVCs") are virtual circuits that are permanently available and are more efficient for connections between nodes that communicate frequently. Thus, a user in a digital network, such as, for example, an ATM network or a Frame Relay network, needs to configure PVCs and SPVCs on a node-by-node basis, which requires proper and timely synchronization of data within the respective nodes.

The digital network is constructed of digital switches coupled together through digital communication links such as, for example, trunks. The trunks carry the cells of information between the digital switches along the connection. The digital switches route the cells from incoming communication links to outgoing communication links and finally to the destination node.

A multiservice digital switch, such as, for example, an ATM multiservice digital switch, includes one or more control modules, such as, for example, one or more controller cards, and several types of service modules, such as, for example multiple line cards. The control modules have a typical 1:1 redundancy and include storage components to store the database configuration belonging to the entire ATM digital switch. Since the storage components are interchangeable and may be replaced independent of one another, the control modules need to ensure that the database configuration information is synchronized and available to all control modules. One solution involves the use of a unique identifier within the ATM digital switch, such as, for example a transaction identifier, for each piece of data residing in a standby storage component and to determine which pieces of data are out of synchronization with the active storage component in the redundant ATM digital switch. However, since the transaction identifier is unique only within the switch, if a storage component native to the switch is replaced with a non-native storage component, the synchronization of data may be affected.

SUMMARY OF THE INVENTION

A system and method to detect non-native storage components to manage configuration in a communications network are disclosed. A stored key set is retrieved from each storage component of a network switch in a communications network, the stored key set identifying each storage component in relation to the switch. The stored key set of each storage component is validated. Finally, a new key set is generated for each storage component if the stored key set is an invalid key set.

Other features and advantages of the present invention will be apparent from the accompanying drawings and from the detailed description, which follows below.

BRIEF DESCRIPTION OF THE DRAWINGS

The present invention is illustrated by way of example and not limitation in the figures of the accompanying drawings in which like references indicate similar elements and in which.

DETAILED DESCRIPTION

According to embodiments described herein, a system and method to detect non-native storage components to manage configuration in a communications network are disclosed.

As will be described in more detail below, a stored key set is retrieved from each storage component of a network switch in a communications network, the stored key set identifying each storage component in relation to said switch. The stored key set of each storage component is validated. Finally, a new key set is generated for each storage component if the stored key set is an invalid key set.

Figure 1:
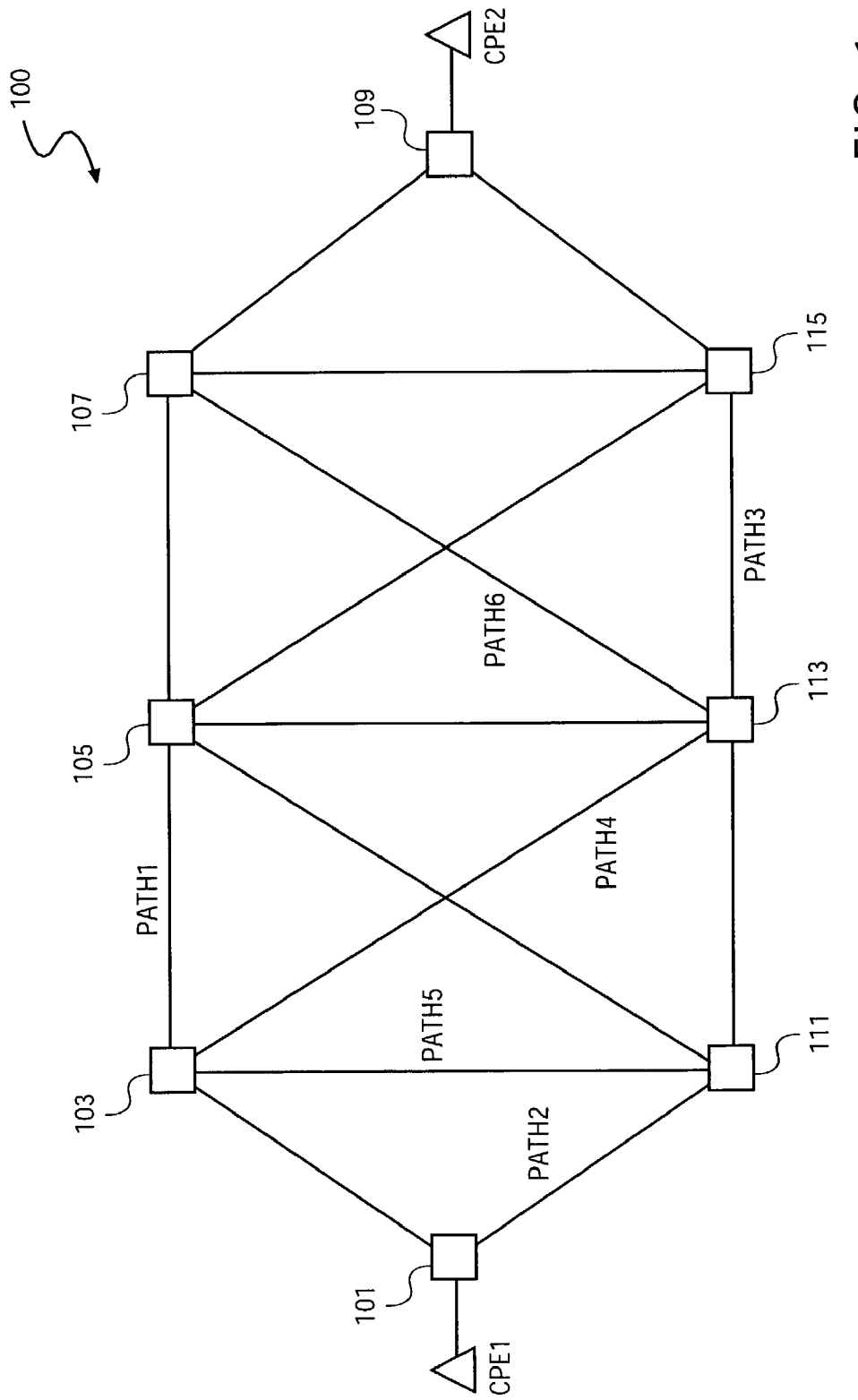
FIG. 1 is an exemplary diagram of a digital communications network environment in which embodiments of the present invention can be implemented.

FIG. 1 illustrates an exemplary diagram of a digital communications network environment in which embodiments of the present invention can be implemented. Referring to FIG. 1, the digital network environment 100 includes a plurality of nodes such as, for example, network switches 101, 103, 105, 107, 109, 111, 113, and 115, which are interconnected through a plurality of trunks. The trunks support the digital network 100 by transferring data, for example, from a starting client CPE1 connected to a starting node 101 to an ending client CPE2 connected to a destination node 109.

The digital network environment 100 may include a variety of networks, such as an asynchronous transfer mode ("ATM") network, a virtual private network ("VPN"), or a combination of virtual private networks and non-virtual private networks. The network 100 includes a plurality of clients coupled with each other through network 100. Client 1 (CPE1) and client 2 (CPE2) can each be a workstation, computer, server, or other similar device, for example.

The plurality of network nodes 101, 103, 105, 107, 109, 111, 113, and 115 are interconnected through a plurality of paths, such as Path 1 through Path 6. A path is a connection between nodes, clients, or end users. A path can include a plurality of paths for connecting any number of nodes within the digital network 100 for transferring data from CPE1 to CPE2. For one embodiment, the path is chosen to be the best route available between clients, such as CPE1 and CPE2, for making a connection at the time a communication request is placed.

Each node in a path is linked to all its neighboring nodes and to all other nodes in the network through the neighboring nodes. A node has a capability of receiving data, processing data, and passing data along to another node. A decision is made at each node to route received data to another node. For example, node 105 may receive data from node 103 and pass the data along to any selected neighborhood node, such as node 111, 113, 115, or 107.

For one embodiment, each node in the path of the cell is a distributed multiservice switch coupled to a trunk, such as, for example, an ATM distributed multiservice switch. The trunks coupled to each ATM multiservice switch in the cell path may either be of the same size or a different size. For example, node 103 may be an ATM switch coupled to an OC12 trunk and the node 105 may be an ATM switch coupled to an OC48 trunk.

A plurality of links or trunks may exist between any two nodes in the digital network 100. The plurality of links aid in exchange of data between any two nodes by allowing transportation of cells on the links. The links may be of any form, such as a cable wire, fiber optic line, an RF connection, or a satellite connection. The plurality of links between any two nodes allows multiple communications between the two nodes at any one time.

Figure 2:
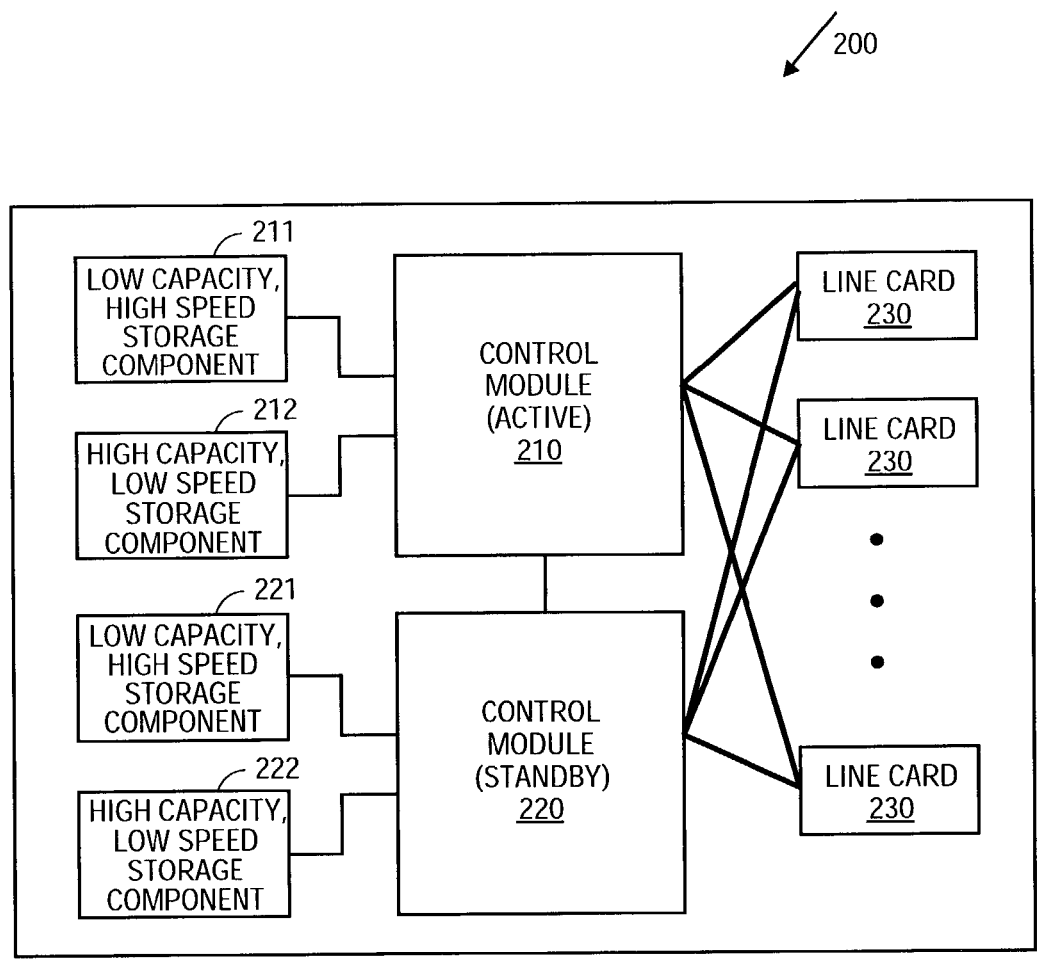
FIG. 2 illustrates one embodiment of a network node capable of receiving, processing, and outputting data within the communications network.

FIG. 2 illustrates one embodiment of a network node capable of receiving, processing, and outputting data within the communications network. Network node 200 shown in FIG. 2 is similar to the other network nodes within the network 100.

Network node 200, such as, for example a distributed multiservice switch, includes a digital processing system for processing data received by and to be sent by the network node. The switch 200 includes one or more control modules, of which control modules 210 and 220 are shown, each control module 210, 220 being coupled to multiple service modules, such as, for example, line cards 230. User traffic may be received through one line card 230 and transmitted through another line card 230. This cross-connection is determined by the control module 210 or 220 upon the establishment of a connection. Typically, each line card 230 also contains a hardware module (not shown) to accomplish bit-level and cell-level functions (such as recombining, quality of service, etc.) and a software module (not shown) for reprogramming of hardware upon changing connections.

For one embodiment, the control modules within the switch 200 have 1:1 redundancy. Therefore, control module 210 is designated as an active control module and control module 220 is designated as a standby control module. The control modules 210 and 220 are programmable hardware and/or software modules to control activities within the multiservice switch 200. The control modules 210, 220 may typically run various protocols, such as the PNNI protocol, for example, and may contain datagrams for encapsulating resource configuration information within a user definable programmable data unit ("PDU") of a signaling protocol (e.g., the Service Specific Connection Oriented Protocol ("SSCOP")). Alternatively, such software may be implemented elsewhere within the switch 200 or external to the switch 200.

For one embodiment, the active control module 210 is coupled to one or more storage components, such as, for example, a low capacity, high speed active storage component 211 and a high capacity, low speed active storage component 212. The standby control module 220 is similarly coupled to one or more storage components, such as, for example, a low capacity, high speed standby storage component 221 and a high capacity, low speed standby storage component 222.

For one embodiment, the low capacity, high speed active storage component 211 and the low capacity, high speed standby storage component 221 are battery-protected random-access memories ("BRAM") and are used to store shelf configuration for the switch 200. For example, the firmware version information of each line card 230 requires fast access and needs to be persistent. Alternatively, components 211 and 221 may be other known types of storage devices used to store such shelf configuration, such as, for example, non-volatile random access memories ("NVRAM"), or other similar storage devices.

For one embodiment, the control modules 210 and 220 may also include other respective storage devices, such as for example, static random access memories ("SRAM") or dynamic random access memories ("DRAM"), to store data or program codes, or to store temporary variables or other intermediate information during execution of instructions by a central processing unit (CPU) (not shown) or signal processor (not shown). The CPU and the signal processor can be used to process information and/or signals for the switch 200. The signal processor can also be used to process speech or audio information and signals for speech processing and recognition.

For one embodiment, the high capacity, low speed active storage component 212 and the high capacity, low speed standby storage component 222 are hard disk drives used to store persistent database configuration of the switch 200, such as, for example, node configuration information, network configuration information (network topology, connection information, etc.), event logs, saved configuration files, firmware files, and other configuration information. Alternatively, components 212 and 222 may be other known types of storage devices used to store such configuration information, such as, for example flash disk drives, optical disk drives, or other similar mass storage devices.

For one embodiment, each storage component 211, 212, 221, and 222 is detachable and may be replaced independently. For example, storage components 212 and 222 may be replaced independent of the storage components 211 and 221. The control modules 210 and 220 synchronize the database configuration information stored in their respective storage components. For one embodiment, each storage component 211, 212, 221, and 222 stores a key set, the stored key set to identify each storage component in relation to the switch 200, as described in further detail below.

Figure 3:
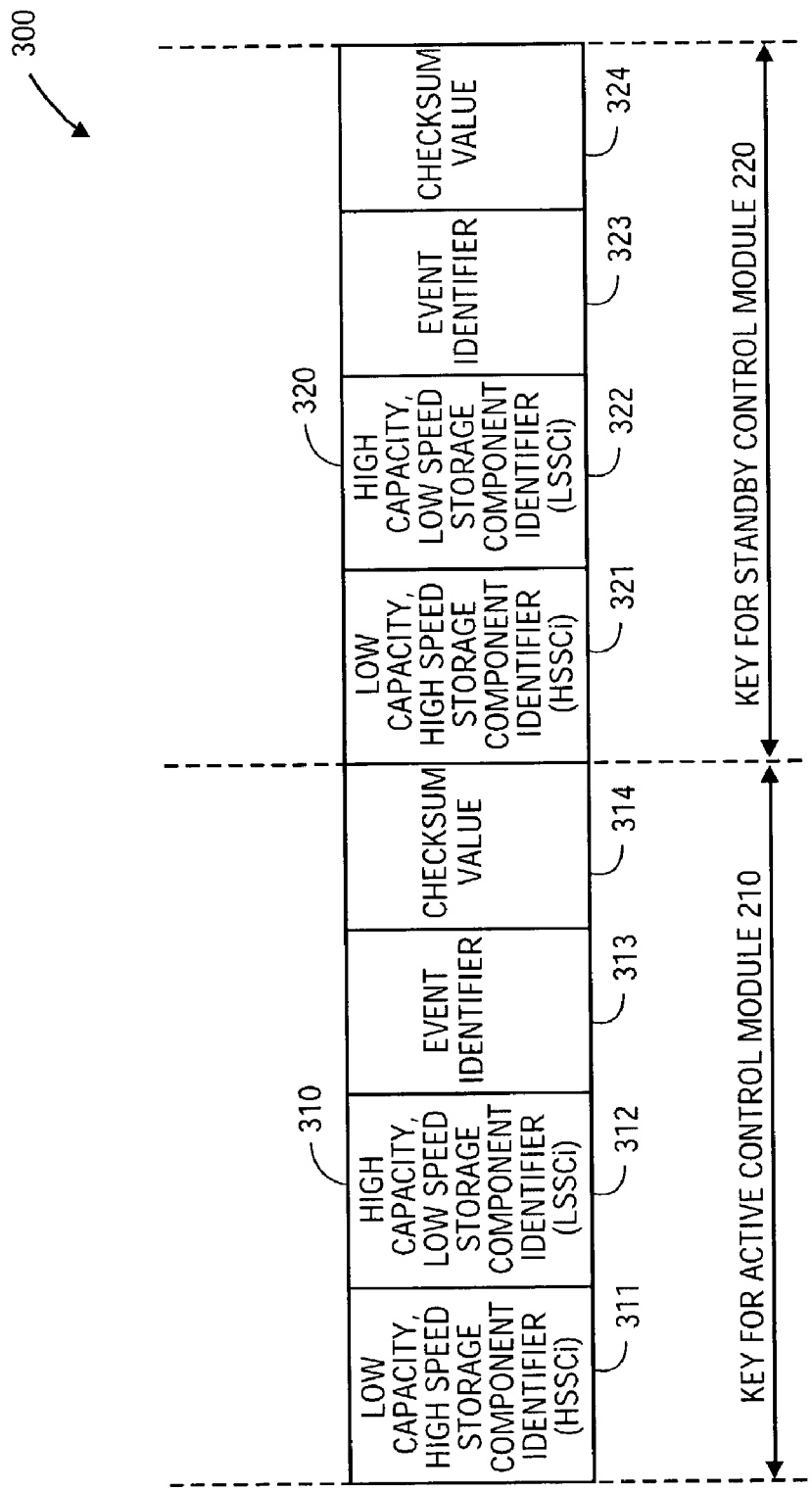
FIG. 3 illustrates one embodiment of a key set generated for each storage component within the network node.

FIG. 3 illustrates one embodiment of a key set generated for each storage component within the network node. As illustrated in FIG. 3, for one embodiment, the key set 300 includes a key 310 generated for the active control module 210 and a key 320 generated for the standby control module 220. Alternatively, one key is generated for each control module within the switch 200. The active control module 210 generates the two keys 310, 320 and stores the key set 300 within each storage component 211, 212, 221, and 222. The length of each key 310, 320 depends on the number of storage components coupled to the respective control module 210, 220 and further depends on multiple identifiers, as described in further detail below. The key set 300 ties the storage components of both the active control module 210 and the standby control module 220 to the switch 200 and makes each storage component that stores the key set 300 a native component to the switch 200.

For one embodiment, the key 310 generated for the active control module 210 includes a low capacity, high speed active storage component identifier (HSSCi) 311 of the active storage component 211, a high capacity, low speed active storage component identifier (LSSCi) 312 of the active storage component 212, an event identifier 313, and a key set value, for example, a checksum value 314. Similarly, the key 320 generated for the standby control module 220 includes a corresponding low capacity, high speed standby storage component identifier (HSSCi) 321 of the standby storage component 221, a corresponding high capacity, low speed standby storage component identifier (LSSCi) 322 of the standby storage component 222, a corresponding event identifier 323, and a corresponding checksum value 324.

For one embodiment, each HSSCi 311 and 321 and each LSSCi 312 and 322 is a unique identifier, such as, for example, a serial number, stored within the respective storage component 211, 221, 212, and 222. Each HSSCi 311 and 321 and each LSSCi 312 and 322 is a twelve-character string, including a terminating NULL character. Alternatively, the HSSCis 311, 321 and LSSCis 312, 322 may be strings of different lengths.

For one embodiment, the event identifiers 313 and 323 are time stamp values unique to the generation of the key set 300 and are twelve bytes in length. The event identifiers 313 and 323 could be identical or, alternatively, may have different values. Alternatively, the event identifiers may be random numbers generated by a pseudo random number generator (not shown) to uniquely identify the generation of the key set 300. In an alternate embodiment, the lengths of event identifiers 313 and 323 may have different values or may have a value different than twelve bytes.

For one embodiment, the checksum values 314 and 324 are calculated over the respective HSSCis 311, 321, LSSCis 312, 322, and event identifiers 313, 323 using a CRC32 algorithm. Alternatively, other algorithms may be used to calculate the checksum values 314 and 324.

For one embodiment, the active control module 210 generates the key set 300 and stores the key set 300 within each storage component in response to certain trigger events within the switch 200, as described in further detail in connection with FIG. 4.

Figure 4:
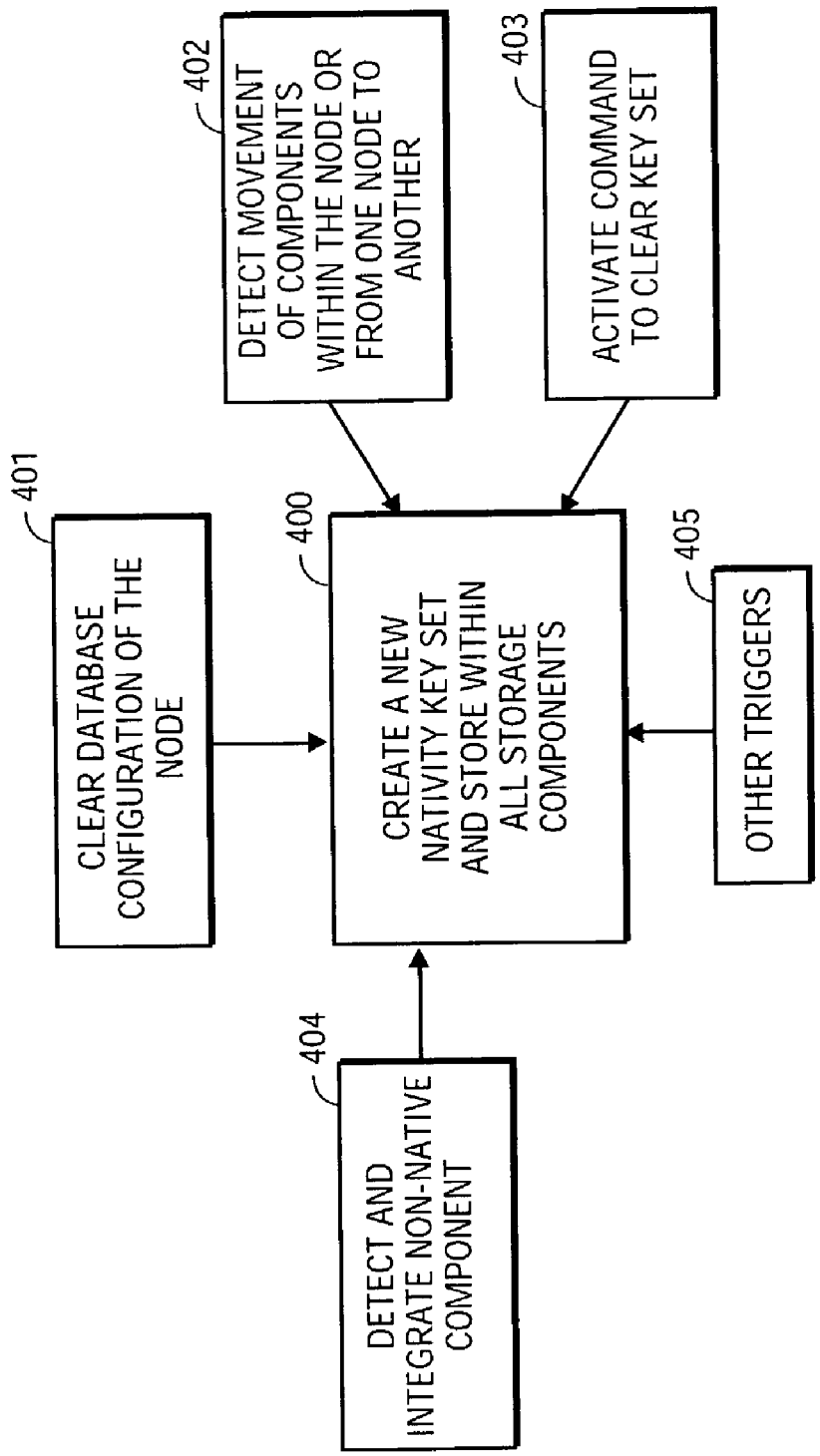
FIG. 4 is a flow diagram illustrating one embodiment of a method to generate the key set.

FIG. 4 is a flow diagram illustrating one embodiment of a method to generate the key set. FIG. 4 illustrates trigger events that may elicit the generation of a new nativity key set 300 and storage of the key set 300 within each storage component 211, 212, 221, 222.

For one embodiment, at processing block 401, the database configuration of the entire node 200 is cleared. At processing block 402, movement of storage components within the node 200 or from one node to another, such as, for example, replacement of a storage component of the node 200 or switching of storage components within the node 200. At processing block 403, a command to clear the existing key set is activated. At processing block 404, a component non-native to the node 200 is detected and integrated within the node 200. Alternatively, other triggers 405 related to activities within the node 200 may be activated to prompt the generation of a new nativity key set 300 and storage of the key set 300 within each storage component 211, 212, 221, 222.

For one embodiment, the non-nativity of a storage component is determined using the stored key set 300 within the switch 200. If the active control module 210 is operational, the stored key set 300 is retrieved from each storage component 211, 212, 221, 222. For one embodiment, the standby control module 220 transmits the stored key set 300 from the low capacity, high speed standby storage component 221 and the high capacity, low speed standby storage component 222 to the active control module 210 within initial arbitration messages. Alternatively, the active control module 210 requests the stored key set 300 from each standby storage component 221, 222 within the switch 200.

The active control module 210 further validates the stored key set 300 of each storage component 211, 212, 221, 222. For one embodiment, the active control module 210 validates the integrity of the stored key set 300 of each storage component 211, 212, 221, 222 using each corresponding component configuration information. The active control module 210 compares the stored key set 300 of each storage component to the corresponding configuration information of the component and declares a key set 300 invalid if it detects that the stored key set 300 fails to match the corresponding configuration information of the storage component. The key set 300 of each storage component is then cleared and a new key set 300 is generated and stored within each storage component.

In an alternate embodiment, prior to receipt of the stored key set 300 from the low capacity, high speed standby storage component 221 and the high capacity low speed standby storage component 222, the active control module 210 may compare the stored key sets 300 of the low capacity, high speed active storage component 211 and the high capacity low speed active storage component 212. If the key sets 300 of the storage components 211 and 212 do not match, either one of the storage components 211, 212 may be arbitrarily declared non-native and cleared or a user-defined action may be taken. In yet another alternate embodiment, the low capacity high speed storage component 211 may be declared non-native and its data may be cleared and be replaced with data stored within the high capacity low speed storage component 212.

Subsequently, if the integrity of the stored key set 300 of each storage component is validated, the active control module 210 validates the equivalency of the stored key sets 300 retrieved from each storage component 211, 212, 221, 222. For one embodiment, the active control module 210 compares the received key set 300 of each standby storage component 221, 222 with the stored key set 300 retrieved from each active storage component 211, 212. If all the key sets 300 match, then all storage components on the standby control module 220 are native to the switch 200.

Otherwise, if a stored key set 300 is detected as having a mismatched value, the active control module 210 identifies the respective standby storage component 221 or 222 that has a different key set. For one embodiment, the active control module 210 further clears data residing on the non-native standby storage component 221 or 222. Alternatively, the active control module 210 informs the standby control module 220 of the non-native storage component and directs the standby control module 220 to clear the data residing on the non-native component.

Subsequently, the active control module 210 generates a new key set 300 for the switch 200, and stores the new key set 300 on each storage component 211, 212, 221, 222. Alternatively, the active control module 210 stores the new key set 300 on the active storage components 211 and 212 and transmits the new key set 300 to the standby control module 220 with instructions to store the new key set 300 on each standby storage component 221, 222.

Figure 5:
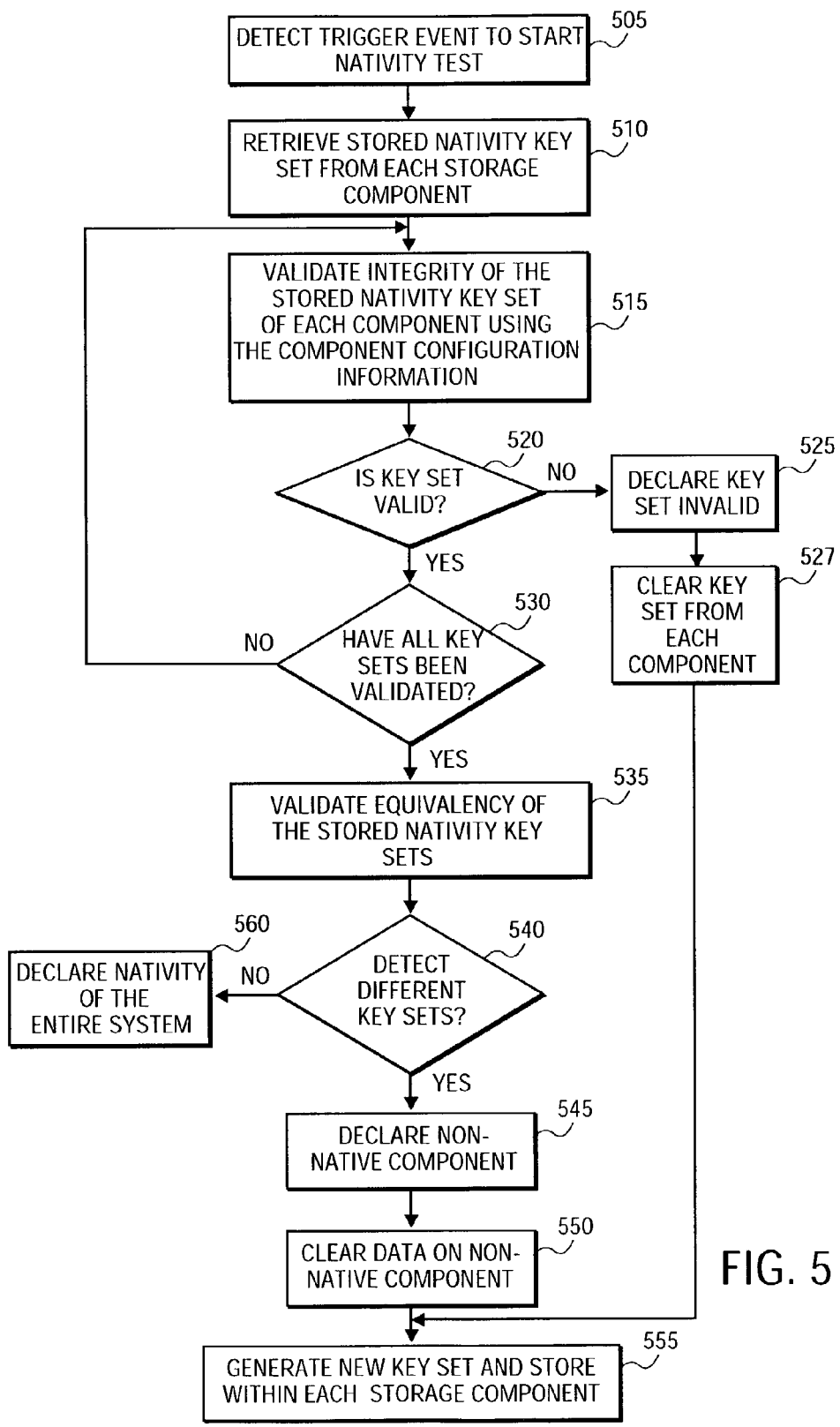
FIG. 5 is a flow diagram illustrating one embodiment of a method to detect non-native storage components within the network node.

FIG. 5 is a flow diagram illustrating one embodiment of a method to detect non-native storage components within the network node. As illustrated in FIG. 5, at processing block 505, a trigger event to start the nativity test is detected.

At processing block 510, the stored nativity key set 300 is retrieved from each storage component 211, 212, 221, 222. At processing block 515, the integrity of the stored key set 300 of each storage component is validated using the corresponding component configuration information.

At processing block 520, a decision is made whether the stored key set 300 is valid. For one embodiment, if the stored key set 300 is invalid, then at processing block 525, the stored key set 300 is declared invalid. Further, at processing block 527, the stored key set is cleared from each storage component 211, 212, 221, 222. Finally, at processing block 555, a new key set 300 is generated and is stored within each storage component 211, 212, 221, 222. Alternatively, if the stored key set 300 is invalid, an alert may be issued to communicate to a user the failure of the validity test. Subsequently, the user may clear the stored key set 300 and may request generation of the new key set 300.

Otherwise, if the stored key set 300 is valid, at processing block 530, a decision is made whether all stored key sets 300 have been validated. If there are still key sets 300 to be validated, the procedure jumps to processing block 515 and blocks 515, 520, 525, 527, and 530 are repeated. Otherwise, at processing block 535, the equivalency of the stored key sets 300 is validated.

At processing block 540, a decision is made whether any different key sets 300 have been detected. If two key sets 300 fail to match, at processing block 545, the corresponding storage component is declared non-native. For one embodiment, at processing block 550, data residing on the non-native component is cleared. Finally, at processing block 555, a new key set 300 is generated and is stored within each storage component within the switch 200. Otherwise, if all key sets 300 match, at processing block 560, the nativity of the entire system is declared. In an alternate embodiment, an alert may be issued to communicate to a user that the procedure uncovered a non-native storage component. Subsequently, the user may clear data residing on the non-native component and may request generation of a new key set 300.

Thus, a system and method to detect non-native storage components to manage configuration in a communications network have been disclosed. Embodiments of the present invention may be implemented in software programs executed on some form of a processing core (such as a signal processor or a central processing unit of a microprocessor or microcontroller) or otherwise implemented or realized upon or within a machine-readable or computer readable medium. A machine-readable medium includes any mechanism for storing or transmitting information in a form readable by a machine (e.g., a computer or a switch). For example, a machine readable medium includes read-only memory ("ROM"); random-access memory ("RAM"); magnetic disk storage media; optical storage media; flash memory devices; or any other type of media suitable to store information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
   retrieving a stored key set from each storage component of a network switch in a communications network, said stored key set identifying said each storage component in relation to said switch, wherein said stored key set for each storage component includes a first storage component identifier associated with an active module and a second storage component identifier associated with a standby module;
   validating said stored key set of said each storage component, wherein said validating further comprises:
      comparing said stored key set of said each storage component to corresponding configuration information of said each storage component; and
      detecting that said stored key set is valid if said stored key matches said corresponding configuration information;
      validating equivalency between stored key sets of said each storage component;
      and detecting that said stored key set is invalid if said stored key of one storage component fails to match said stored key set of remaining storage components within said switch; and
   generating a new key set for said each storage component if said stored key set is an invalid key set.

2. The method according to claim 1, further comprising storing said new key set within said each storage component.

3. The method according to claim 1, wherein said network is an asynchronous transfer mode (ATM) network.

4. The method according to claim 3, wherein said network switch is an ATM distributed multiservice switch.

5. The method according to claim 1, wherein said validating further comprises:
   detecting said invalid key set if said stored key set fails to match said corresponding configuration information.

6. The method according to claim 5, wherein said configuration information further comprises a component identifier corresponding to said each storage component within said switch.

7. The method according to claim 1, wherein generating said new key set further comprises clearing data residing on a storage component within said switch, said storage component corresponding to said invalid key set.

8. The method according to claim 1, wherein said stored key set is generated upon detection of movement of at least one storage component within said switch.

9. The method according to claim 1, wherein said stored key set is generated upon detection of activation of a command to clear said each storage component within said switch.

10. The method according to claim 1, wherein said stored key set is generated upon detection of clearing of configuration information pertaining to at least one storage component within said switch.

11. A method comprising:
   retrieving a stored key set from each storage component of a network switch in a communications network, said stored key set identifying said each storage component in relation to said switch, wherein said stored key set for each storage component includes a first storage component identifier associated with an active module and a second storage component identifier associated with a standby module;

validating said stored key set of said each storage component; and generating a new key set for said each storage component if said stored key set is an invalid key set, wherein generating said new key set further comprises:

retrieving a component identifier for said each storage component; calculating a key set value using said component identifier and at least one unique event identifier to identify said generation of said new key set; and creating said new key set using said component identifier of said each storage component, said at least one event identifier, and said key set value.

12. The method according to claim 11, wherein said key set value is a checksum value calculated using the CRC32 algorithm.

13. The method according to claim 11, wherein said component identifier is a unique identifier corresponding to said each storage component.

14. The method according to claim 11, wherein said at least one event identifier is a time stamp value unique to said generation of said new key set.

15. The method according to claim 11, wherein said at least one event identifier is a random number generated by a pseudo random number generator to uniquely identify said generation of said new key set.

16. A method comprising:

retrieving a stored key set from each storage component of a network switch in a communications network, said stored key set identifying said each storage component in relation to said switch, wherein said stored key set for each storage component includes a first storage component identifier associated with an active module and a second storage component identifier associated with a standby module;

validating said stored key set of said each storage component; and generating a new key set for said each storage component if said stored key set is an invalid key set, wherein said retrieving further comprises requesting said stored key set from at least one standby storage component coupled to a standby control module of said switch, wherein said validating further comprises comparing said stored key set of said at least one standby storage component to said stored key set of at least one active storage component within an active control module of said switch; and detecting said invalid key set if said stored key set of said at least one active storage component fails to match said stored key set of said at least one standby storage component.

17. The method according to claim 16, wherein generating said new key set further comprises:

storing said new key set within said at least one active storage component; and transmitting said new key set to said standby control module to be stored within said at least one standby storage component.

18. A network system comprising:

means for retrieving a stored key set from each storage component of a network switch in a communications network, said stored key set identifying said each storage component in relation to said switch, wherein said stored key set for each storage component includes a first storage component identifier associated with an active module and a second storage component identifier associated with a standby module;

means for validating said stored key set of said each storage component, wherein said validating further comprises:

means for comparing said stored key set of said each storage component to corresponding configuration information of said each storage component; and means for detecting that said stored key set is valid if said stored key matches said corresponding configuration information;

means for validating equivalency between stored key sets of said each storage component; and means for detecting that said stored key set is invalid if said stored key of one storage component fails to match said stored key set of remaining storage components within said switch; and means for generating a new key set for said each storage component if said stored key set is an invalid key set.

19. The network system according to claim 18, further comprising means for storing said new key set within said each storage component.

20. The network system according to claim 18, further comprising:

means for detecting said invalid key set if said stored key set fails to match said corresponding configuration information.

21. The network system according to claim 18, further comprising:

means for clearing data residing on a storage component within said switch, said storage component corresponding to said invalid key set.

22. A network system comprising:

means for retrieving a stored key set from each storage component of a network switch in a communications network, said stored key set identifying said each storage component in relation to said switch, wherein said stored key set for each storage component includes a first storage component identifier associated with an active module and a second storage component identifier associated with a standby module;

means for validating said stored key set of said each storage component; and means for generating a new key set for said each storage component if said stored key set is an invalid key set;

means for retrieving a component identifier for said each storage component;

means for calculating a key set value using said component identifier and at least one unique event identifier to identify said generation of said new key set; and means for creating said new key set using said component identifier of said each storage component, said at least one event identifier, and said key set value.

23. A network system comprising:

means for retrieving a stored key set from each storage component of a network switch in a communications network, said stored key set identifying said each storage component in relation to said switch, wherein said stored key set for each storage component includes a first storage component identifier associated with an active module and a second storage component identifier associated with a standby module;

means for validating said stored key set of said each storage component; and means for generating a new key set for said each storage component if said stored key set is an invalid key set;

means for requesting said stored key set from at least one standby storage component coupled to a standby control module of said switch;

means for comparing said stored key set of said at least one standby storage component to said stored key set of at least one active storage component within an active control module of said switch; and means for detecting said invalid key set if said stored key set of said at least one active storage component fails to match said stored key set of said at least one standby storage component.

24. The network system according to claim 23, further comprising: means for storing said new key set within said at least one active storage component; and means for transmitting said new key set to said standby control module to be stored within said at least one standby storage component.

25. A computer readable medium encoded with executable instructions, which, when executed in a processing system, cause said processing system to perform a method comprising:

retrieving a stored key set from each storage component of a network switch in a communications network, said stored key set identifying said each storage component in relation to said switch, wherein said stored key set for each storage component includes a first storage component identifier associated with an active module and a second storage component identifier associated with a standby module;

validating said stored key set of said each storage component, wherein said validating further comprises:
comparing said stored key set of said each storage component to corresponding configuration information of said each storage component;
detecting that said stored key set is valid if said stored key matches said corresponding configuration information;
validating equivalency between stored key sets of said each storage component;
and detecting that said stored key set is invalid if said stored key of one storage component fails to match said stored key set of remaining storage components within said switch; and generating a new key set for said each storage component if said stored key set is an invalid key set.

26. The computer readable medium according to claim 25, wherein said method further comprises storing said new key set within said each storage component.

27. The computer readable medium according to claim 25, wherein said validating further comprises:
detecting said invalid key set if said stored key set fails to match said corresponding configuration information.

28. The computer readable medium according to claim 25, wherein generating said new key set further comprises:
clearing data residing on a storage component within said switch, said storage component corresponding to said invalid key set.

29. A computer readable medium encoded with executable instructions, which, when executed in a processing system, cause said processing system to perform a method comprising:

retrieving a stored key set from each storage component of a network switch in a communications network, said stored key set identifying said each storage component in relation to said switch, wherein said stored key set for each storage component includes a first storage component identifier associated with an active module and a second storage component identifier associated with a standby module;

validating said stored key set of said each storage component; and generating a new key set for said each storage component if said stored key set is an invalid key set, wherein generating said new key set further comprises:
retrieving a component identifier for said each storage component; calculating a key set value using said component identifier and at least one unique event identifier to identify said generation of said new key set; and
creating said new key set using said component identifier of said each storage component, said at least one event identifier, and said key set value.

30. A computer readable medium encoded with executable instructions, which, when executed in a processing system, cause said processing system to perform a method comprising:

retrieving a stored key set from each storage component of a network switch in a communications network, said stored key set identifying said each storage component in relation to said switch, wherein said stored key set for each storage component includes a first storage component identifier associated with an active module and a second storage component identifier associated with a standby module;

validating said stored key set of said each storage component;

generating a new key set for said each storage component if said stored key set is an invalid key set, wherein said retrieving further comprises requesting said stored key set from at least one standby storage component coupled to a standby control module of said switch, wherein said validating further comprises:
comparing said stored key set of said at least one standby storage component to said stored key set of at least one active storage component within an active control module of said switch; and
detecting said invalid key set if said stored key set of said at least one active storage component fails to match said stored key set of said at least one standby storage component.

31. The computer readable medium according to claim 30, wherein generating said new key set further comprises:
storing said new key set within said at least one active storage component; and
transmitting said new key set to said standby control module to be stored within said at least one standby storage component.

32. A network switch in a communication network, the network switch comprising:
a plurality of storage components; and
a control module coupled to said plurality of storage components to retrieve a stored key set from each storage component, said stored key set identifying said each storage component in relation to said switch, wherein said stored key set for each storage component includes a first storage component identifier associated with an active module and a second storage component identifier associated with a standby module, to validate said stored key set of said each storage component, and to generate a new key set for said each storage component if said stored key set is an invalid key set, wherein the control module validates said stored key set by comparing said stored key set of said each storage component to corresponding configuration information of said each storage component; detecting that said stored key set is valid if said stored key matches said corresponding configuration information; validating equivalency between stored key sets of said each storage component; and detecting that said stored key set is invalid if said stored key of one storage component fails to match said stored key set of remaining storage components within said switch.

33. The network switch according to claim 32, wherein said control module further stores said new key set within said each storage component.

34. The network switch according to claim 32, wherein said control module further detects said invalid key set if said stored key set fails to match said corresponding configuration information.

35. The network switch according to claim 32, wherein said control module further clears data residing on a storage component of said plurality of storage components within said switch, said storage component corresponding to said invalid key set.

36. The network switch according to claim 32, wherein said stored key set is generated upon detection of movement of at least one storage component of said plurality of storage components within said switch.

37. The network switch according to claim 32, wherein said stored key set is generated upon detection of activation of a command to clear said each storage component within said switch.

38. The network switch according to claim 32, wherein said stored key set is generated upon detection of clearing of configuration information pertaining to at least one storage component of said plurality of storage components within said switch.

39. A network switch in a communication network, the network switch comprising:
a plurality of storage components; and
a control module coupled to said plurality of storage components to retrieve a stored key set from each storage component, said stored key set identifying said each storage component in relation to said switch, wherein said stored key set for each storage component includes a first storage component identifier associated with an active module and a second storage component identifier associated with a standby module, to validate said stored key set of said each storage component, and to generate a new key set for said each storage component if said stored key set is an invalid key set, wherein said control module further retrieves a component identifier for said each storage component, calculates a key set value using said component identifier and at least one unique event identifier to identify said generation of said new key set, and creates said new key set using said component identifier of said each storage component, said at least one event identifier, and said key set value.

40. A network switch in a communication network, the network switch comprising:
a plurality of storage components; and
a control module coupled to said plurality of storage components to retrieve a stored key set from each storage component, said stored key set identifying said each storage component in relation to said switch, wherein said stored key set for each storage component includes a first storage component identifier associated with an active module and a second storage component identifier associated with a standby module, to validate said stored key set of said each storage component, and to generate a new key set for said each storage component if said stored key set is an invalid key set, wherein said control module further requests said stored key set from at least one standby storage component coupled to a standby control module within said switch, wherein said control module further compares said stored key set of said at least one standby storage component to said stored key set of at least one active storage component of said plurality of storage components within said switch, and detects said invalid key set if said stored key set of said at least one active storage component fails to match said stored key set of said at least one standby storage component.

41. The network switch according to claim 40, wherein said control module further stores said new key set within said at least one active storage component, and transmits said new key set to said standby control module to be stored within said at least one standby storage component.

* * * * *

UNITED STATES PATENT AND TRADEMARK OFFICE
CERTIFICATE OF CORRECTION

PATENT NO. : 7,586,855 B1  Page 1 of 1
APPLICATION NO. : 10/314013
DATED : September 8, 2009
INVENTOR(S) : Yellai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2007 days.

Signed and Sealed this

Twenty-first Day of September, 2010

David J. Kappos
*Director of the United States Patent and Trademark Office*